Patented Oct. 31, 1950

2,528,262

UNITED STATES PATENT OFFICE 2,528,262

RECOVERY OF MONO-CHLORHYDRINS FROM AQUEOUS SOLUTIONS THEREOF

Edwin Fenton Chandley, Stockport, Herbert Steiner, Eccles, and Emanuel Zimkin, Monton, England, assignors to Petrocarbon Limited, London, England No Drawing. Application October 22, 1947, Serial No. 781,486. In Great Britain October 25, 1946

5 Claims. (Cl. 260—633)

This invention relates to the preparation and isolation of chlorohydrins, especially ethylene-chlorohydrin.

In the industrial production of ethylene-chlorohydrin by interaction of ethylene and hypochlorous acid, the immediate product is an aqueous solution of the chlorohydrin and hydrochloric acid, which after neutralisation invariably contains one or more inorganic salts. In most cases the maximum concentration of the chlorohydrin attained is 8%. The isolation of the chlorohydrin is usually carried out by distillation, often after the addition of a quantity of common salt, but even under the optimum conditions, large quantities of water have to be evaporated, and, furthermore, the chlorohydrin forms with the water constant boiling azeotropic mixtures, so that the isolation becomes complicated and expensive.

In British specification No. 564,090 there is described a process for the industrial production of ethylene chlorohydrin by interaction of ethylene and hypochlorous acid in which isolation of the ethylene chlorohydrin from solutions which contain either the salt present from the production process or this salt plus a quantity of subsequently added inorganic salt, is effected by liquid organic solvents which are insoluble or only slightly soluble in aqueous salt solutions and contain oxygen in the form of carbonyl groups, for example aldehydes, ketones and carboxylic acid esters.

Such solvents are defined as belonging to the class of compounds containing a carbonyl group in their molecule, for example aldehydes, ketones and carboxylic esters.

After the chlorohydrin has been extracted from the aqueous phase into the organic phase, it is necessary to heat the extract in order to recover the chlorohydrin by distillation.

We have found, however, that chlorohydrins, especially under the conditions usually encountered in industrial processes, are capable of causing condensation of ketones and aldehydes, the dehydration of alcohols, and to undergo ester exchange in contact with carboxylic esters.

We have now found that for this reason the solvents recommended in British specification No. 564,090, though having high coefficients of extraction for chlorohydrin, are liable to be unstable when heated in the presence of this compound, especially under the conditions usually encountered in industrial processes.

The object of the present invention is to avoid the above-mentioned difficulties while conserving the advantages gained by the use of selective solvent extraction.

The present invention consists in a process for the industrial production of chlorohydrins, in which isolation of the chlorohydrin from solutions which may or may not contain salts, for instance either the salt present from the production process or this salt plus a quantity of subsequently added salt, is effected by extraction with liquid organic solvents comprising liquids containing two or more ether groups per molecule and which are substantially insoluble in water or comprising halogenated derivatives of such liquids.

The invention also consists in a process as set forth in the preceding paragraph in which the chlorohydrin is recovered by distillation under such conditions of temperature and pressure as to reduce the decomposition of the solvent to a minimum.

The invention also consists in a process as set forth in either of the preceding two paragraphs in which the solvents used are ethylene-glycol-ethyl-butyl-ether or $\beta$-chloro-$\beta'$-ethoxy-diethyl-ether.

The invention also consists in processes for producing chlorohydrins carried out in accordance with any of the following examples and in chlorohydrins or by-products which may be prepared by such methods.

The class of "ethers" is one of the classes of compounds sufficiently stable in the presence of chlorohydrins and non-reactant with them. Simple ethers have not very high coefficients extraction for chlorohydrins, for instance di-ethyl-ether has a coefficient of 0.63 and di-isopropyl ether has a coefficient of 2.5, the coefficient being defined as the ratio of concentration of ethylene-chlorohydrin in equal volumes of solvent and saturated sodium chloride solution. Although sodium chloride has been referred to for purposes of definition it is not essential to employ it or any other electrolyte in carrying out the invention. When accumulating a number of ether groups in the molecule, the coefficient of extraction is increased to a value of 3–4, while conserving the advantage of high stability. This class of compound therefore represents solvents which are most suitable for the isolation of chlorohydrin. Even so, due to the high reactivity of chlorohydrins the temperature must not be unduly raised, if decomposition is to be reduced to a minimum. Accordingly the conditions of recovery of chlorohydrin from the extract have to be chosen in such a way as to take place at the lowest temperature possible, for instance by distillation under reduced pressure.

One group of suitable solvents comprises substantially water insoluble liquids which contain two or more ether groups per molecule. Examples of such compounds are—

Ethylene-glycol-ethyl-butyl-ether.
Propylene-glycol-ethyl-propyl-ether.
$\beta$-$\beta'$dibutoxy-diethyl-ether.

A further group of substantially water insoluble suitable solvents comprises halogenated derivatives of the above-mentioned group. Examples of such compounds are—

$\beta$-chloro-$\beta'$-methoxy-diethyl-ether.
$\beta$-chloro-$\beta'$-ethoxy-diethyl-ether.

Amongst the solvents of the above two groups one should exclude those which have a solubility in saturated sodium chloride solution greater than 5% by weight in the temperature range 0° C. to 50° C. and preferably select those which have the following characteristics:

(1) High affinity for chlorohydrins.
(2) High stability when heated with chlorohydrin.
(3) Ease of separation by distillation, that is having a boiling point at least 10° C. different from that of the chlorohydrin and not forming an azeotrope with the latter.
(4) Good industrial availability.

Compounds combining such characteristics are, for instance, ethylene-glycol-ethyl-butyl-ether and $\beta$-chloro-$\beta'$-ethoxy-diethyl-ether applied to the extraction of ethylene-chlorohydrin. The invention is, however, not limited to the above solvents.

The invention can be carried out by the usual extraction and recovery methods, for example in a countercurrent system. When recovering the chlorohydrin from the extract, the condition of temperature and accordingly of pressure must be chosen in such a way as to reduce decomposition to the minimum, for instance separation by distillation should be carried out under reduced pressure.

The following examples illustrate how the invention has been carried into effect, references to parts and percentages being by weight.

Example 1

An aqueous solution of 8% ethylene chlorohydrin was saturated with common salt and extracted in countercurrent with half its volume of $\beta$-chloro-$\beta'$-methoxy-diethyl-ether in an extraction plant consisting of four extraction stages.

The resulting solution in the organic solvent contained 97.5% of the chlorohydrin originally present in the water. Ethylene chlorohydrin was then recovered by distillation of the solution in vacuo. The stability of the solvent is such that even when heated in the presence of chlorohydrin for 840 hours at 100° C. only 6% is decomposed.

Example 2

An aqueous solution of 8% ethylene chlorohydrin was saturated with common salt and extracted in countercurrent with half its volume of ethylene-glycol-ethyl-butyl-ether in apparatus having five stages. The resulting solution in the organic solvent contained 98% of the chlorohydrin originally present in the water. Ethylene chlorohydrin was then recovered by distillation of the solution in vacuo. The stability of the solvent is high, and when heated in the presence of chlorohydrin for 220 hours at 100° C. only 10% decomposes.

Example 3

An aqueous solution of 8% ethylene chlorohydrin was treated as in Example 2 except that the solvent used was $\beta$-chloro-$\beta'$-ethoxy-diethyl-ether; the resulting solution in the organic solvent contained 98% of the chlorohydrin originally present in the water. Ethylene chlorohydrin was then recovered by distillation in vacuo.

The stability of the solvent is high and even when heated in the presence of chlorohydrin at 100° C. for 168 hours, only about 3% decomposes.

We claim:

1. A process for the recovery of monochlorohydrins of olefins containing from 2 to 4 carbon atoms from aqueous solutions thereof which consists in extracting the chlorohydrin with a substantially water-insoluble organic solvent comprising a mono-chlorinated derivative of an ether containing 2 low molecular ether groups per molecule and recovering the chlorohydrin from the organic solvent solution by distillation at a pressure below 200 mms. Hg absolute.

2. A process for the recovery of ethylene chlorohydrin from aqueous solutions thereof which consists in extracting the chlorohydrin with a substantially water-insoluble organic solvent comprising a mono-chlorinated derivative of an ether containing 2 low molecular groups per molecule and recovering the chlorohydrin from the organic solvent solution by distillation at a pressure below 200 mms. Hg absolute.

3. A process for the recovery of ethylene chlorohydrin from aqueous solutions thereof which consists in extracting the chlorohydrin with $\beta$-chloro-$\beta'$-ethoxy-diethyl-ether and then recovering the chlorohydrin from the organic solvent solution by distillation at a pressure below 200 mms. Hg absolute.

4. A process for the recovery of ethylene chlorohydrin from aqueous solutions thereof which consists in extracting the chlorohydrin with $\beta$-chloro-$\beta'$-methoxy-diethyl-ether and then recovering the chlorohydrin from the organic solvent solution by distillation at a pressure below 200 mms. Hg absolute.

5. A process for the recovery of low-molecular mono-chlorohydrins from aqueous solutions thereof which comprises extracting the chlorohydrin with an organic solvent selected from the class consisting of $\beta$-chloro-$\beta'$-methoxy-diethyl-ether and $\beta$-chloro-$\beta'$-ethoxy-diethyl-ether and then recovering the chlorohydrin from the organic solvent by distillation under reduced pressures.

EDWIN FENTON CHANDLEY.
HERBERT STEINER.
EMANUEL ZIMKIN.

REFERENCES CITED

The following references are of record in the file of this patent:

UNITED STATES PATENTS

| Number | Name | Date |
|---|---|---|
| 2,144,612 | Britton et al. | Jan. 24, 1939 |
| 2,198,600 | Britton et al. | Apr. 30, 1940 |
| 2,296,687 | Rosenstein | Sept. 22, 1942 |
| 2,456,350 | Weizmann | Dec. 14, 1948 |